United States Patent
Mischel, Jr. et al.

(10) Patent No.: US 9,173,509 B2
(45) Date of Patent: Nov. 3, 2015

(54) APPARATUSES AND METHODS FOR CHANGING THE APPEARANCE OF AN OBJECT MOUNTED BEHIND A MIRROR

(75) Inventors: James V. Mischel, Jr., Seattle, WA (US); James V. Mischel, Sr., Lynwood, WA (US)

(73) Assignee: ELECTRIC MIRROR, LLC, Everett, WA (US)

( * ) Notice: Subject to any disclaimer, the term of this patent is extended or adjusted under 35 U.S.C. 154(b) by 392 days.

(21) Appl. No.: 13/068,776

(22) Filed: May 18, 2011

(65) Prior Publication Data

US 2012/0033312 A1    Feb. 9, 2012

Related U.S. Application Data

(60) Provisional application No. 61/395,896, filed on May 18, 2010.

(51) Int. Cl.
| | |
|---|---|
| *G02B 5/08* | (2006.01) |
| *A47G 1/02* | (2006.01) |
| *G06F 1/16* | (2006.01) |
| *G09F 13/12* | (2006.01) |
| *H04N 5/64* | (2006.01) |
| *H04N 5/72* | (2006.01) |
| *H04N 5/65* | (2006.01) |

(52) U.S. Cl.
CPC ............... *A47G 1/02* (2013.01); *G06F 1/1601* (2013.01); *G09F 13/12* (2013.01); *H04N 5/64* (2013.01); *H04N 5/72* (2013.01); *H04N 5/65* (2013.01)

(58) Field of Classification Search
USPC ................. 359/811, 813, 815, 819–822, 839, 359/290–292, 298, 201.2, 214.1, 439, 359/485.07, 514, 602, 608, 871
See application file for complete search history.

(56) References Cited

U.S. PATENT DOCUMENTS

| | | | |
|---|---|---|---|
| 6,377,233 B2* | 4/2002 | Colgan et al. ................... 345/84 |
| 8,099,247 B2* | 1/2012 | Mischel, Jr. et al. ............ 702/44 |
| 2008/0055757 A1* | 3/2008 | Uken et al. .................... 359/872 |
| 2010/0182143 A1* | 7/2010 | Lynam ......................... 340/465 |
| 2010/0182698 A1* | 7/2010 | Nemeth et al. ................ 359/576 |

* cited by examiner

*Primary Examiner* — Joseph P Martinez
*Assistant Examiner* — Brandi Thomas
(74) *Attorney, Agent, or Firm* — Peloquin, PLLC; Mark S. Peloquin, Esq.

(57) ABSTRACT

An apparatus includes a mirror. The mirror has a transmissivity, a reflectivity, a front side, and a back side. The apparatus further includes a substantially transparent layer, the substantially transparent layer is located on the back side; and a dark layer, the dark layer contains an aperture and is applied to the substantially transparent layer wherein a combination of the mirror, the substantially transparent layer, and the dark layer have a combined reflectivity and a combined color when viewed from the front side which causes a media display device to vanish when the media display device is off and is mounted over the aperture on the back side of the mirror.

20 Claims, 8 Drawing Sheets

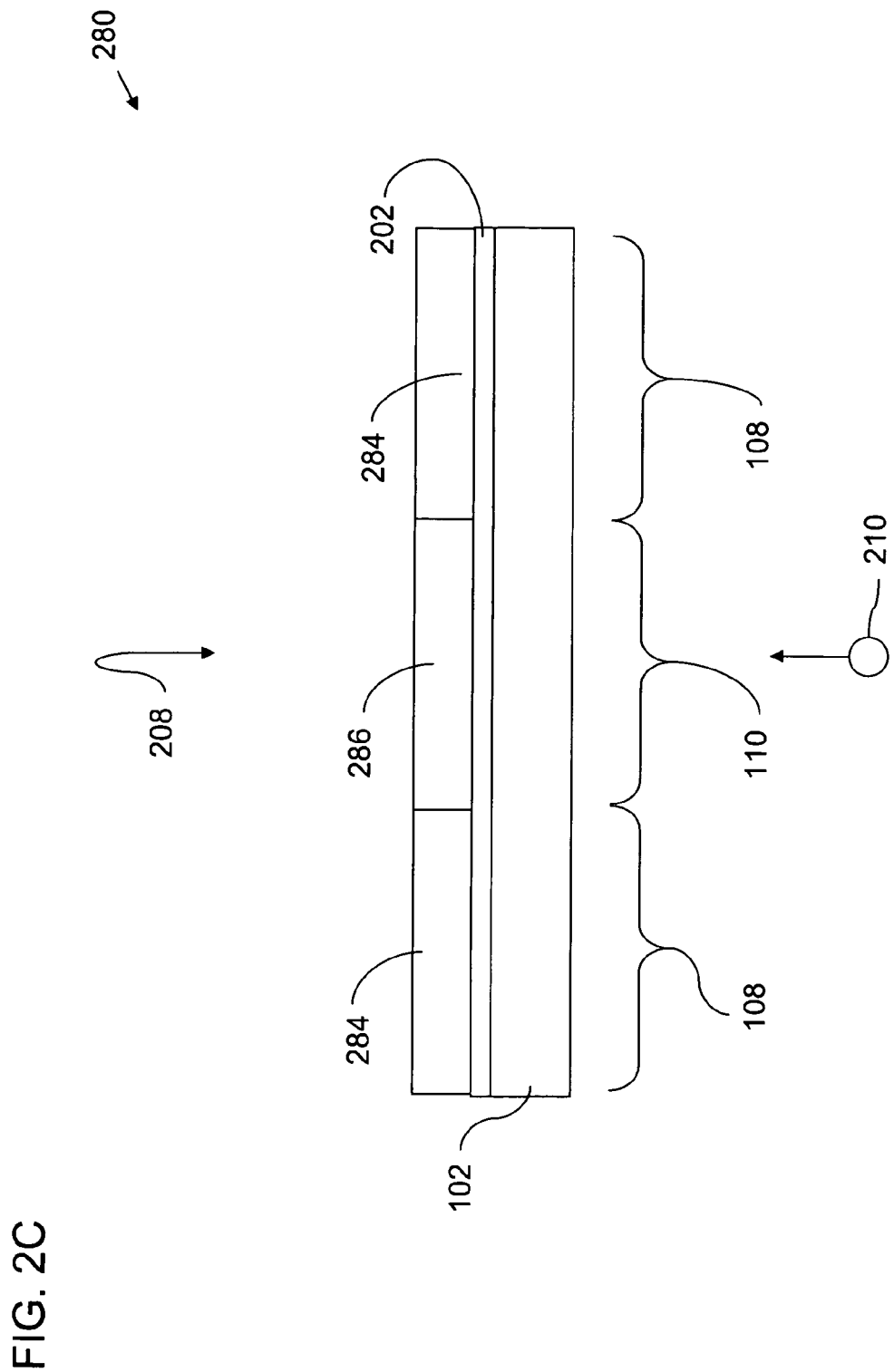

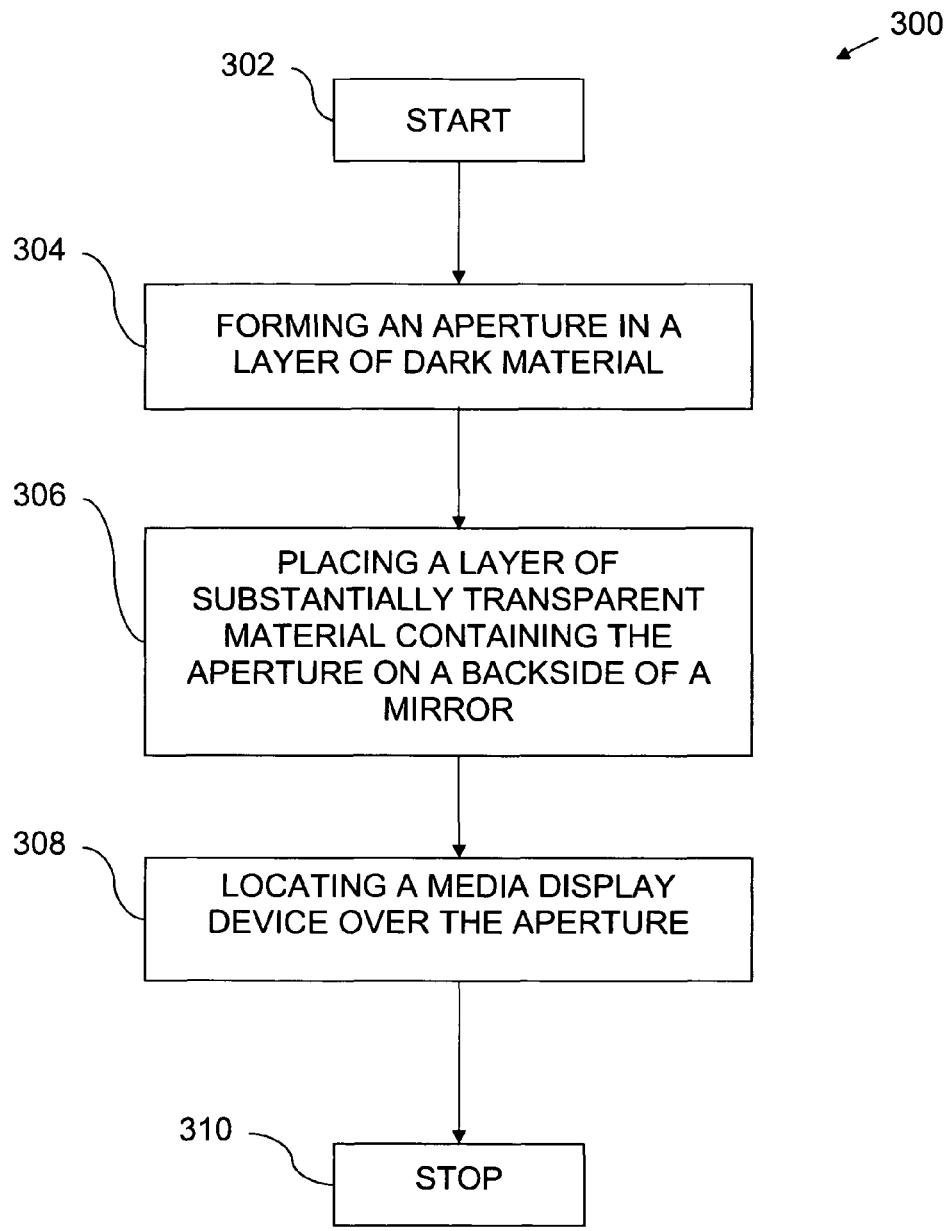

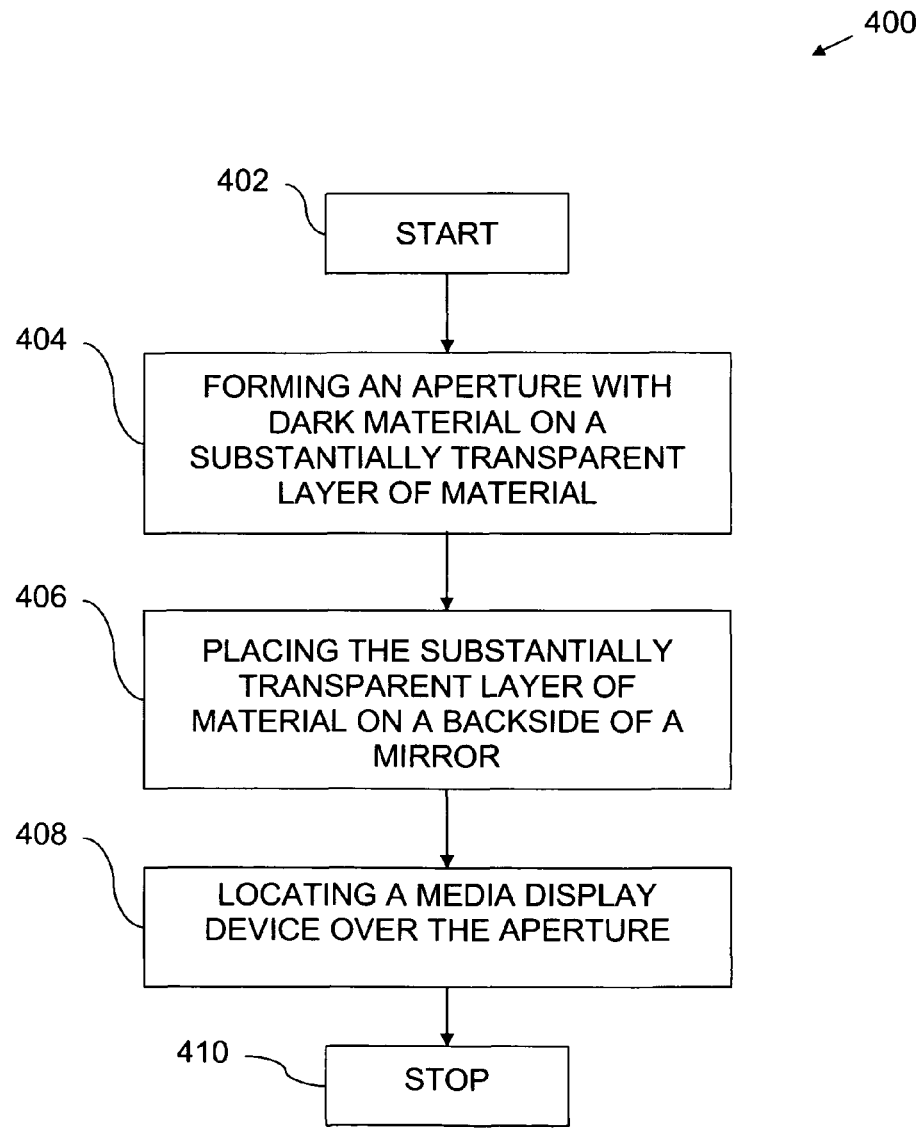

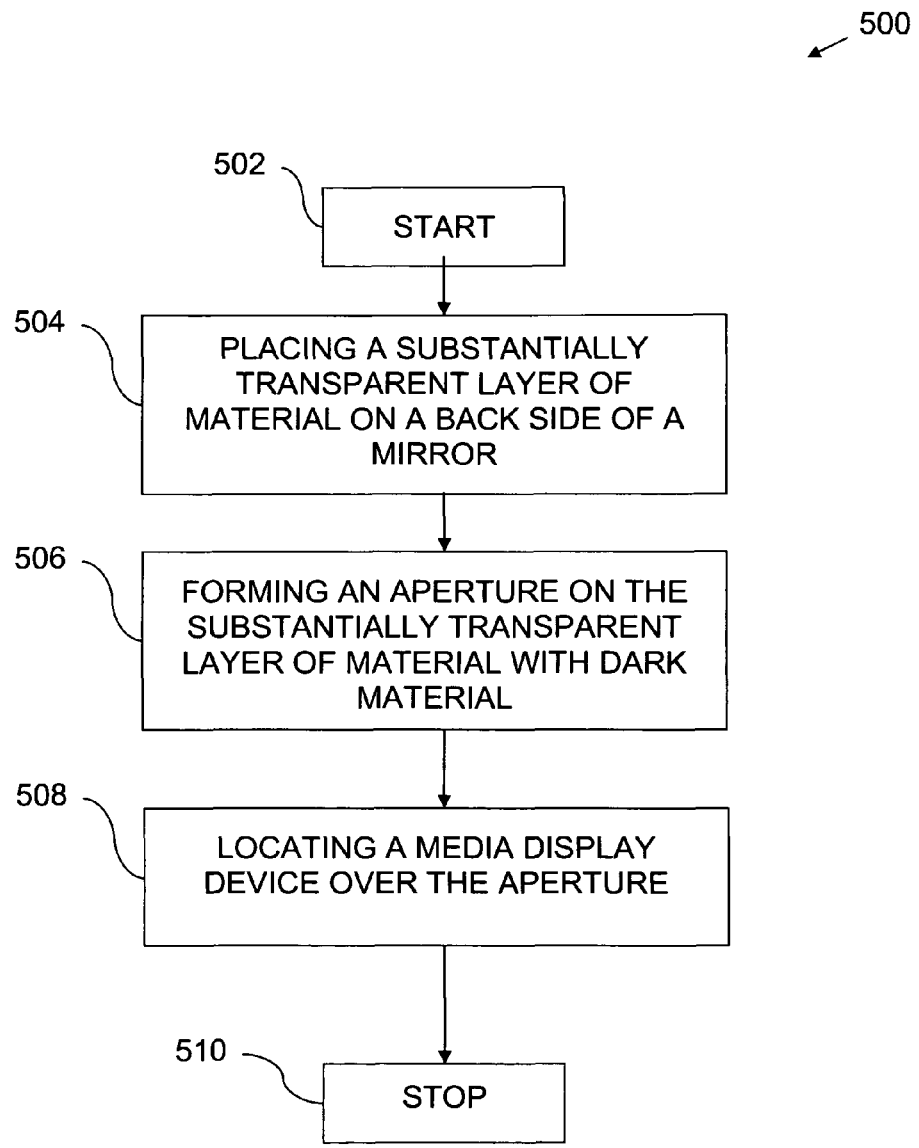

APPARATUSES AND METHODS FOR CHANGING THE APPEARANCE OF AN OBJECT MOUNTED BEHIND A MIRROR

BACKGROUND OF THE INVENTION

1. Field of Invention

The invention relates generally to mirrors and media display devices, such as a computer monitor or a television, and more specifically to adjusting the visibility of a media display device when the media display device is mounted behind a mirror.

2. Art Background

Currently available mirror and media display devices typically include a media display device, such as a television, mounted to the back of a mirror. This arrangement is a convenient space saving device as it embeds a media display device in the existing space occupied by a mirror and provides the dual functionality of a mirror and media display device within a given planar area. Although available, these devices typically suffer from the ability to see the location of the television or the perimeter of the television when the television is in the off state. The transmissivity and reflectivity of a mirror are roughly inversely related. Thus, a mirror with a high transmissivity generally has a low reflectivity, and a mirror with a high reflectivity generally has a low transmissivity. As a result, a mirror with a high transmissivity will allow more light from a media display device, such as a television, located behind the mirror to pass through the mirror, resulting in a brighter image that is more easily viewed. However, such a combination of mirror and media display device will have a relatively low reflectivity, which allows a user to "see through" the mirror due to the lower reflectivity of the mirror. In such a case, when a media display device is off, instead of the media display device vanishing into the mirror an observer is able to distinguish the television from the rest of the mirror. Thus, the media display device does not "vanish" and the appearance and functionality of the mirror is degraded. This may present a problem.

Previous efforts to make the media display device "vanish" into the mirror when the media display device is in the off state have been directed to applying a black paint directly to the back side of the mirror. Other techniques have included placing a sheet of black material such as steel, plywood, medium density fiberboard, cloth to the back side of the mirror everywhere except where the media display device is located. While these techniques vary in their effectiveness, they do not make the media display device vanish with high transmissivity glass. This may present a problem.

Other previous techniques for trying to make the media display device "vanish" when in the off state have included locating a sheet of black material behind the mirror, as described above, with a gap maintained between the backside of the mirror and sheet of material placed on the backside of the mirror. This method increases the manufacturing cost by requiring clips, alignment of the gap over a large surface, etc. all of which are difficult to do and do not produce a mirror that permits the media display device to "vanish," when in the off state with high transmissivity glass used for the mirror. Thereby creating a distraction to the user who views one's self in the mirror. This may present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 2C illustrates yet another cross-sectional view of the system of FIG. 1, according to embodiments of the invention.

FIG. 3 illustrates a method according to embodiments of the invention.

FIG. 4 illustrates another method according to embodiments of the invention.

FIG. 5 illustrates yet another method according to embodiments of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are described for incorporating a media display device behind a mirror, which allows the media display device to "vanish" when in an off state and to be visible within the mirror when the media display device is in an on state. Embodiments of the invention permit even a high transmissivity mirror to be used and the media display device will "vanish" into the mirror when the media display device is in an off state.

Figure 1:
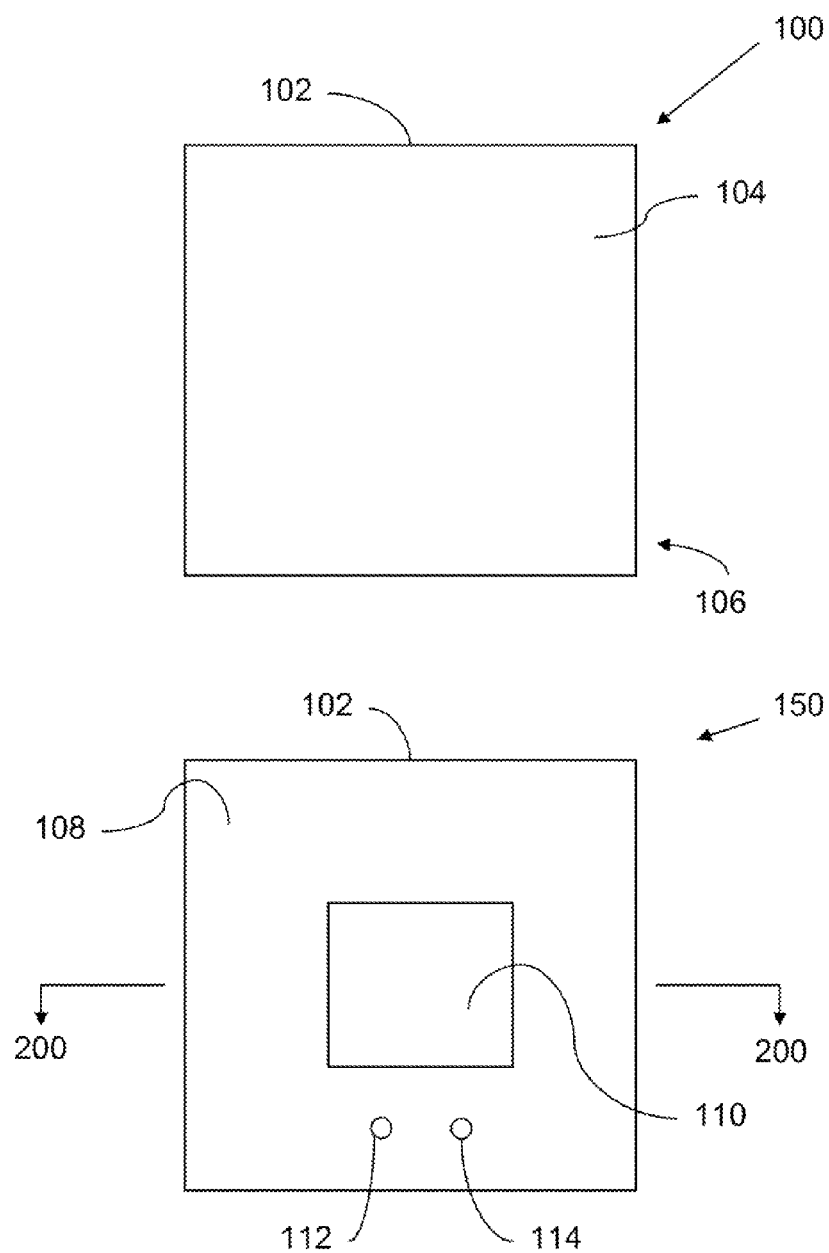
FIG. 1 illustrates a mirror system, according to embodiments of the invention.

FIG. 1 illustrates, generally at 100, a mirror system, according to embodiments of the invention. With reference to FIG. 1, a mirror 102 has a front side 104 and a back side is indicated at 106. In various embodiments, the mirror 102 is a semi-transparent mirror, e.g., one-way mirror, two-way mirror, sputter mirror, vapor coating mirror, etc. Mirrors having different degrees of transmissivity can be used, such as low transmissivity, medium or high transmissivity.

Figure 2A:
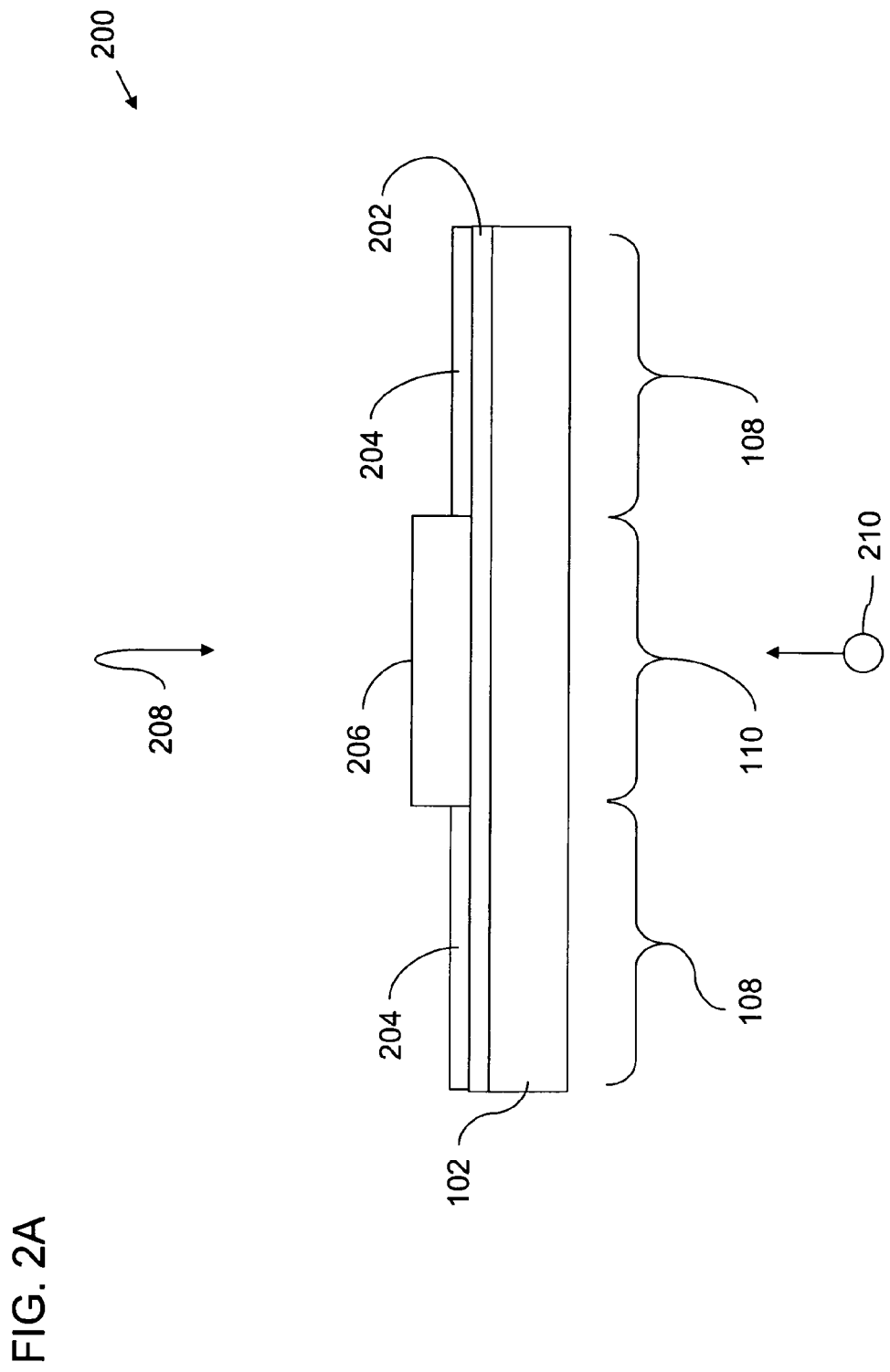
FIG. 2A illustrates a cross-sectional view of the system of FIG. 1, according to embodiments of the invention.

A layer of substantially transparent material, described further below in conjunction with FIG. 2A, is applied to the mirror 102 on the backside 106. A layer of dark material is applied to the layer of substantially transparent material to form an aperture indicated at 110. Thus, at 150 in FIG. 1 the front side of the mirror surface 104 is divided into an aperture 110 and an area 108. A media display device will be positioned over the aperture 110 on the back side 106. A cross section of the mirror 102 is indicated at 200 and is illustrated in FIG. 2A.

In some embodiments, one or more additional apertures are included in the dark material as shown at 112 and 114 in FIG. 1. These apertures can be used for indicators, such as a power on indicator and/or a communication port such as an infrared (IR) communication port. These apertures will be visible from the front of the mirror when certain commands are sent to the electronics located behind the mirror, such as for example "Power On." Powering on the media display device can cause illumination of a Power On indicator and then when the media display device is powered off, the Power On indicator vanishes. Similar functionality can be obtained with the IR port as desired.

In an alternative embodiment, a layer of dark material is not applied to the layer of substantially transparent material to form an aperture; the aperture is formed by a frame or bezel that is part of the media display device. The frame or bezel extends around the media display device and forms an aperture when the media display device is placed behind the layer of substantially transparent material. An example of such an embodiment is described more completely below in conjunction with FIG. 2C.

As used in this detailed description of embodiments, media display device includes, but is not limited to, flat panel displays made with various technologies such as plasma, liquid crystal, light emitting diode (LED), touch screen displays, etc. Embodiments of the invention are not limited by the technology employed to create a media display device. A media display device can have a frame around it. This frame is sometimes referred to as a bezel. In some instances it may be desirable to let the frame or bezel appear within the aperture 110. In other instances it may be desirable to hide the frame or bezel outside of the aperture 110. In other instances, this frame or bezel itself provides the dark region or layer of material. Thus, embodiments are described herein to accommodate a variety of implementations of media display devices and the particular packaging that accompanies the different devices.

FIG. 2A illustrates, generally at 200, a cross-sectional cut-away view of the system of FIG. 1. With reference to FIG. 2A, a cross-section of the mirror is illustrated at 200. A substantially transparent layer of material 202 is adhered to a backside of the mirror 102. A dark layer of material 204 is adhered to the substantially transparent layer of material 202. An aperture 110 (FIG. 1 and FIG. 2A) is formed in the dark layer of material 204 so that a media display device 206 can be located over the aperture 110 on the back side of the mirror 102.

The substantially transparent layer of material is, in various embodiments, a transparent layer of polyester, urethane, a layer of acrylic plastic, a layer of glass or another substantially transparent layer of material that can be placed behind or adhered to the back side of mirror 102. In one embodiment, the substantially transparent layer of material is a 350 micron thick layer of Armorcoat® 14 Mil Clear window film. This film transmits a large amount of visible light and is substantially transparent. As used in this detailed description of embodiments, substantially transparent includes both transparent materials and those that transmit a large amount of visible light, which are characterized as having a high transmissivity or high transmittance. As used in this detailed description of embodiments transparent and clear are used interchangeably. Note further that as used in this detailed description of embodiments, "substantially transparent" or "substantially clear" includes those materials, which are 100% transparent or 100% clear.

Note that transmittance and transmissivity are used interchangeably to refer to the same property, i.e., transmission of light through a material. In like manner, reflectance and reflectivity refer to the same property, i.e., reflection of light from a material.

The dark layer of material 204 can be created by adhering a dark film to the substantially transparent layer 202. In such an embodiment, the dark film has a pre-cut aperture sized to match the dimensions of a media display device 206. The aperture can be sized slightly smaller than the media display device. The exact size of the aperture relative to the dimensions of the media display device will depend on the color and flatness of a frame or bezel that might be part of a particular media display device.

In other embodiments, a dark layer 204 can be painted onto a substantially transparent layer 202. In yet other embodiments, a dark layer 204 is deposited or printed onto a substantially transparent layer 202.

In order to permit a media display device to "vanish" when off, it is desirable for a color and a reflectivity of a combination of a mirror 102, a substantially transparent layer 202, and a dark layer 204, when viewed over region 108 (from position 210) to be substantially the same as a color and a reflectivity of a combination of the mirror 102, the substantially transparent layer 202, and the media display device 206. While it is important for the color of the dark layer 204 to be close to the color of the media display device 206 when the media display device is in an off state, embodiments of the invention can tolerate greater differences in color mismatch while still rendering the media display device "invisible."

In various embodiments, a dark layer 204 can be a black layer, an off black layer, a gray layer, etc. depending on the color of a media display device when in the off state. Printing a dark layer with a printer, such as an ink jet printer facilitates easy adjustment of a color of the dark layer to facilitate matching to a color of a media display device. Ink jet printing provides a low cost high quality method of applying a dark layer to a substantially transparent layer. Ink jet printing permits very accurate location of an aperture on a substantially transparent layer. Ink jet printing the dark layer can also be done after the substantially transparent layer has been applied to the back side of a mirror. Other forms of depositing dark material to form a dark layer can be used in place of ink jet printing. Ink Jet printing is described herein merely as one technology that can be used to deposit dark material to form an aperture over a substantially transparent layer of material.

A dark layer applied to the substantially transparent material on the backside of a mirror prevents stray light from illuminating the backside of the mirror. This helps reduce back illumination of the mirror and helps enhance the desired "vanishing" effect, where the media display device "vanishes" into the mirror when the media display device is in an off state. A black tape or strip of black material can be applied around the perimeter of the system of mirror, substantially clear layer, and dark layer, material or structure to help prevent the intrusion of stray light from the perimeter of the mirror.

When the substantially transparent layer is made from a material that can sustain large deformation without fracture or cracking, such as plastic or a plastic film, the mirror 102 takes on a safety glass quality since the substantially transparent layer will adhere to the pieces of glass which would result if the mirror were to break.

Figure 2B:
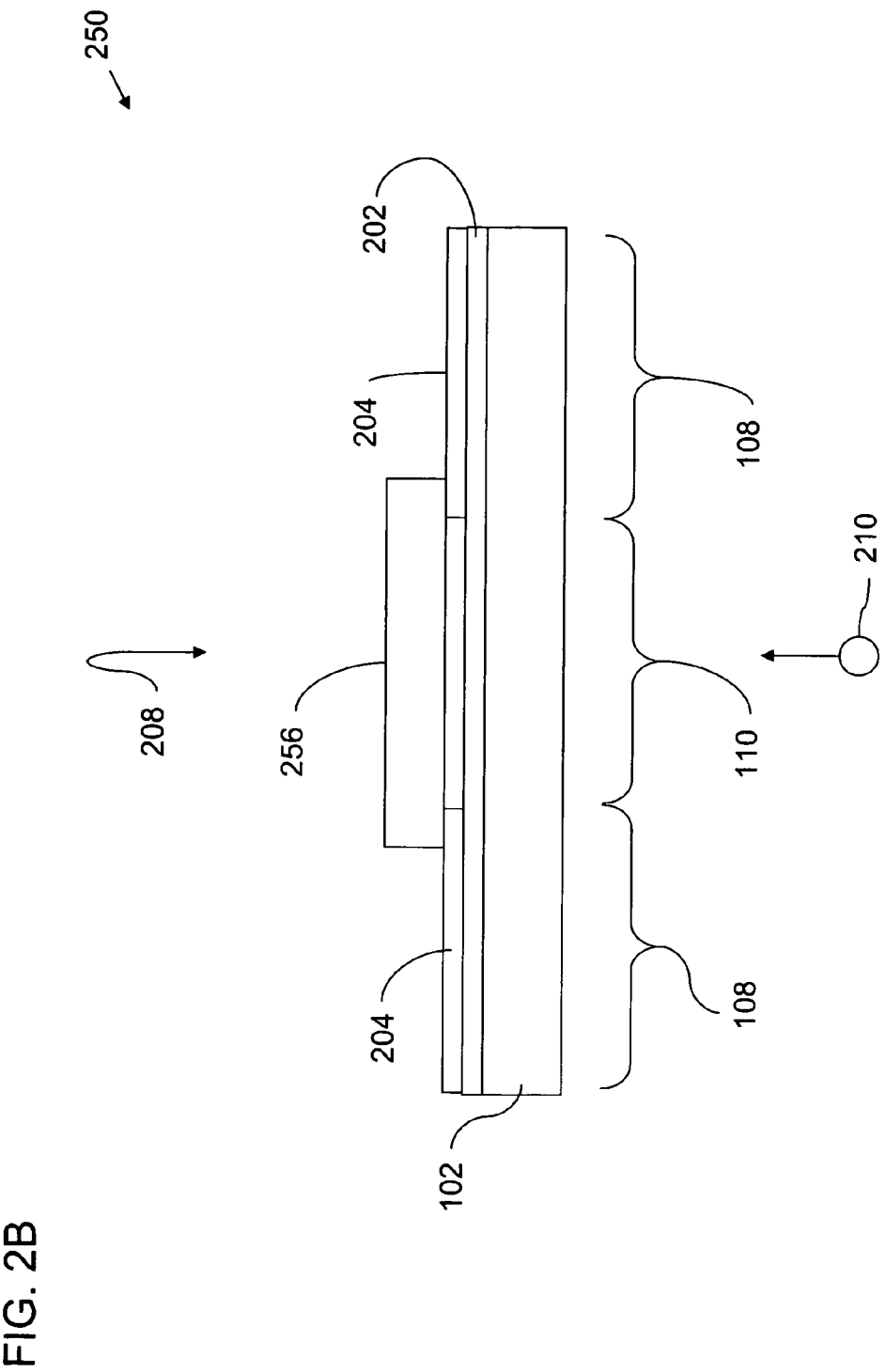
FIG. 2B illustrates another cross-sectional view of the system of FIG. 1, according to embodiments of the invention.

FIG. 2B illustrates, generally at 250, another cross-sectional view of the system of FIG. 1, according to embodiments of the invention. With reference to FIG. 2B, a dark layer 204 is sized smaller than an area of a media display device 256. Any frame or bezel belonging to the media display device 256 is outside of the aperture 110. The mounting arrangement shown in FIG. 2B can be beneficial when a color of the frame or bezel differs from the media display device's screen when the media display device is in an off state. When the media display device is in the off state it vanishes into the mirror.

FIG. 2C illustrates, generally at 280, yet another cross-sectional view of the system of FIG. 1, according to embodiments of the invention. FIG. 2C represents a mounting scenario where the dark layer is provided by the frame or bezel of the media display device. In such a case, no dark layer need be applied to the substantially clear layer 202. With reference to FIG. 2C, a media display device 286/284 has a viewing screen 286 and a frame 284. The media display device 286/284 is placed over the substantially clear layer 202. The substantially clear layer 202 and the media display./device 286/284 are located on the back side 208 of the mirror 102. When the media display device is in the off state it vanishes into the mirror.

FIG. 3 illustrates, generally at 300, a method according to embodiments of the invention. With reference to FIG. 3, a method starts at a block 302. At a block 304 an aperture is formed in a layer of dark material. At a block 306, a layer of substantially transparent material containing the aperture is placed onto a backside of a mirror. At a block 308, a media display device is located over the aperture. The method stops at a block 310.

FIG. 4 illustrates, generally at 400, another method according to embodiments of the invention. With reference to FIG. 4, a method starts at a block 402. At a block 404 an aperture is formed with dark material on a substantially transparent layer of material. At a block 406 the substantially transparent layer of material is placed on a backside of a mirror. At a block 408, a media display device is located over the aperture. The method stops at a block 410.

FIG. 5 illustrates, generally at 500, yet another method according to embodiments of the invention. With reference to FIG. 5, a method starts at a block 502. At a block 504, a substantially transparent layer of material is placed on a back side of a mirror. At a block 506, an aperture is formed on the substantially transparent layer of material with dark material. At a block 508, a media display device is located over the aperture. At a block 510 the method stops.

Figure 6:
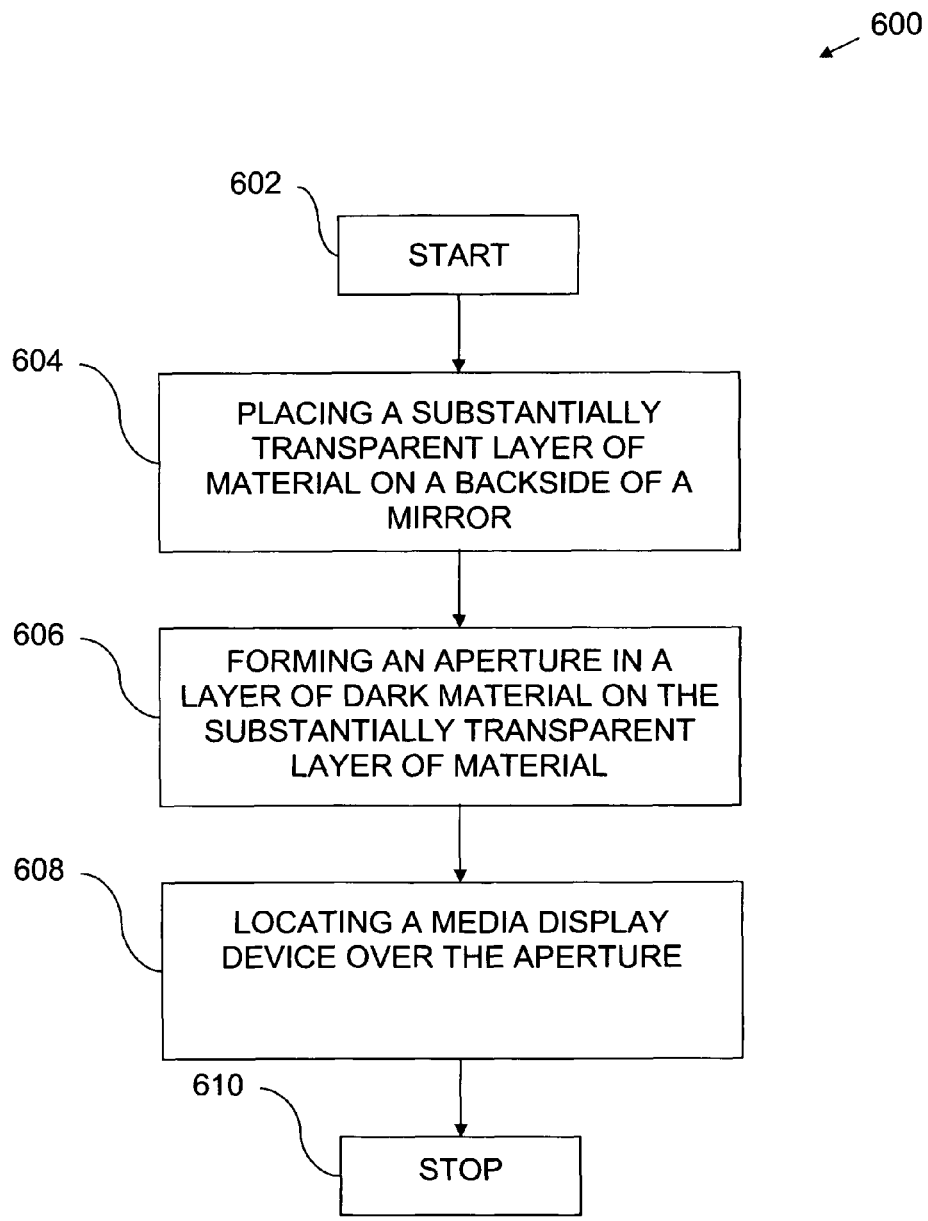
FIG. 6 illustrates still another method according to embodiments of the invention.

FIG. 6 illustrates, generally at 600, still another method according to embodiments of the invention. With reference to FIG. 6, a method starts at a block 602. At a block 604, a substantially transparent layer of material is placed on a back side of a mirror. At a block 606, an aperture is formed in a layer of dark material on the substantially transparent layer of material. At a block 608, a media display device is located over the aperture. At a block 610 the method stops.

Within various embodiments, a dark layer of material can be applied to a substantially transparent layer of material before the substantially transparent layer of material is applied to the mirror or after the substantially transparent layer of material is applied to the mirror.

As described above, a range of mirrors having different degrees of transmissivity can be used with embodiments of the invention and still produce a system where a media display device will "vanish" into the mirror when the media display device is in the off state. The "vanishing" effect will increase as the substantially transparent layer of material increases in thickness. A non-limiting example, for the purpose of illustration, is that for mirrors with low transmittance such as a transmittance of 20% and a reflectance of 80% a thinner substantially transparent layer of material can be used with the dark layer. In another embodiment, another non-limiting example for the purpose of illustration is a mirror system that uses a mirror with a higher transmittance of approximately 40% (with approximately 60% reflectance). In this example, a thicker layer of substantially transparent material such as the 350 micron thick layer of Armorcoat® 14 Mil Clear window film will produce the desired "vanishing" effect for a media display device in the off state. Note that the same "thicker layer of material" described directly above can be used with the low transmittance mirrors to achieve the vanishing effect. It is not necessary to use a thinner layer of substantially transparent material with low transmittance mirror glass.

Embodiments of the invention have been described herein, which can be used to make luminous objects, which are visible behind mirror glass when radiating light energy, "vanish" behind mirror glass when the luminous object stops radiating light energy. In some embodiments, the luminous object has been described as a media display device, a communication or a Power On indicator. These have been given by way of example and are not meant to limit embodiments of the invention. Any object that has two states, one in which it radiates light energy and the other in which it does not radiate light energy can be made to vanish behind a mirror by employing embodiments of the invention.

In the above description of embodiments, the substantially transparent layer of material can be "adhered" to the back side of a mirror or the substantially transparent layer can be placed or located on the backside of the mirror. The vanishing effect will be achieved in either case. In the detailed descriptions provided above, "located" or "placed" were used to describe combining the substantially transparent layer of material on the back side of the mirror; however, the substantially transparent layer of material can be "adhered" instead. Adhering a substantially transparent layer of material can be done over the entire surface of the layer or along a portion of the layer. Embodiments of the invention are not limited thereby.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus, comprising:
  a mirror, the mirror has a transmissivity, a reflectivity, a front side, and a back side;

a substantially transparent layer, the substantially transparent layer is located on the back side; and a dark layer, the dark layer contains an aperture and is applied to the substantially transparent layer wherein a combination of the mirror, the substantially transparent layer, and the dark layer have a combined reflectivity and a combined color when viewed from the front side.

2. An apparatus, comprising:

a mirror, the mirror has a transmissivity, a reflectivity, a front side, and a back side;

a substantially transparent layer, the substantially transparent layer is located on the back side;

a dark layer, the dark layer contains an aperture and is applied to the substantially transparent layer wherein a combination of the mirror, the substantially transparent layer, and the dark layer have a combined reflectivity and a combined color when viewed from the front side; and a media display device, the media display device is positioned over the aperture and on the back side, such that when the mirror is viewed from the front side and the media display device is in the off state, an aperture color and an aperture reflectivity of the mirror in combination with the substantially transparent layer and the media display device are substantially the same as the combined reflectivity and the combined color wherein the media display device substantially vanishes when viewed from the front side; and when the media display device is in an on state it is visible when the mirror is viewed from the front side.

3. The apparatus of claim 1, wherein the substantially transparent layer is made from a material selected from the group consisting of urethane, plastic, and glass.

4. The apparatus of claim 2, wherein the dark layer is created with a material selected from the group consisting of black ink, black paint, silver ink, silver paint, a material selected to match a color of the media display device when in an off state, and a black film with a precut aperture therein.

5. The apparatus of claim 4, wherein the media display device is selected from the group consisting of a television, a computer monitor, and a data display.

6. The apparatus of claim 1, wherein the mirror has a transmissivity selected from the group consisting of low transmissivity, medium transmissivity, and high transmissivity.

7. The apparatus of claim 4, wherein the transmissivity is high such that the media display device appears bright when viewed from the front side in an on state.

8. The apparatus of claim 1, wherein a combination of the mirror and the substantially transparent layer creates a safety glass, wherein the substantially transparent layer adheres to the mirror and minimizes loose glass if the mirror should fracture or break and the substantially transparent layer is made from a material which can sustain large deformation without fracturing or cracking.

9. A method comprising:

applying a dark layer of material to a substantially transparent layer of material wherein an aperture is formed during the applying such that no dark layer exists within the aperture;

adhering the substantially transparent layer, after the applying, to a back side of a mirror, wherein a combination of the mirror, the substantially transparent layer, and the dark layer have a combined color and a combined reflectivity when viewed from a front side of the mirror.

10. The method of claim 9, wherein the applying causes the dark layer to adhere to the substantially transparent layer and the applying is done with an ink jet printing technique.

11. The method of claim 9, wherein the dark layer of material is film which adheres to the substantially transparent layer.

12. The method of claim 9, further comprising:

applying a dark layer of material to a substantially transparent layer of material wherein an aperture is formed during the applying such that no dark layer exists within the aperture;

adhering the substantially transparent layer, after the applying, to a back side of a mirror, wherein a combination of the mirror, the substantially transparent layer, and the dark layer have a combined color and a combined reflectivity when viewed from a front side of the mirror; and mounting a media display device over the aperture on the back side, wherein an aperture color and an aperture reflectivity of the mirror in combination with the substantially transparent layer and the media display device, when in an off state, are substantially the same as the combined reflectivity and combined color wherein the media display device substantially vanishes when viewed from the front side; and when the media display device is in an on state it is visible when the mirror is viewed from the front side.

13. The method of claim 12, wherein the media display device is selected from the group consisting of a television, a computer monitor, and a data display.

14. The method of claim 13, further comprising:

providing content for display on the media display device.

15. The method of claim 13, further comprising:

using high transmissivity glass for the mirror, such that the media display device appears bright when it is in an on state.

16. The method of claim 13, further comprising:

specifying a glass with a predefined transmissivity; and selecting a thickness for a substantially transparent layer of material based on the specifying such that the media display device will vanish when in the off state.

17. A method comprising:

adhering a substantially transparent layer of material to a back side of a mirror;

applying a dark layer of material to the substantially transparent layer wherein a color of the dark layer has been selected to resemble a color of a media display device when the media display device is in an off state; and forming an aperture in the dark layer during the applying such that no dark layer exists within the aperture, wherein a combination of the mirror, substantially transparent layer, and the dark layer have a combined color and a combined reflectivity when viewed from a front side of the mirror, wherein the media display device substantially vanishes when viewed from the front side; and when the media display device is in an on state it is visible when the mirror is viewed from the front side.

18. The method of claim 17, wherein the adhering permits the substantially transparent layer to keep pieces of glass attached thereto if the mirror should fracture or crack and the substantially transparent layer is made from a material which can sustain large deformation without fracturing or cracking.

19. The method of claim 17, further comprising:

causing the media display device to substantially vanish when in the off state and viewed from the front side, wherein the media display device is mounted over the aperture on the back side.

20. The apparatus of claim 1, further comprising:
a media display device, the media display device has a frame, the frame provides the dark layer and the media display device is positioned on the back side, such that when the mirror is viewed from the front side and the media display device is in the off state, an aperture color and an aperture reflectivity of the mirror in combination with the substantially transparent layer and the media display device are substantially the same as the combined reflectivity and the combined color wherein the media display device substantially vanishes when viewed from the front side; and when the media display device is in an on state it is visible when the mirror is viewed from the front side.

* * * * *